United States Patent [19]
Chang et al.

[11] Patent Number: 4,707,523
[45] Date of Patent: Nov. 17, 1987

[54] MAGNETIC PARTICLES

[75] Inventors: Manchium Chang, Los Angeles; Michael S. Colvin, Malibu; Alan Rembaum, Pasadena; Gil F. Richards, Duarte, all of Calif.

[73] Assignee: California Institute of Technology, Pasadena, Calif.

[21] Appl. No.: 786,649

[22] Filed: Oct. 11, 1985

[51] Int. Cl.$^4$ ................................................. C02F 8/42
[52] U.S. Cl. ............................... 525/372; 525/327.1; 525/328.2; 525/328.7; 525/329.4; 525/329.9; 525/330.2; 525/330.5; 525/330.6; 525/333.3; 525/333.6; 525/367; 525/368; 525/371; 530/402; 530/409; 536/38
[58] Field of Search ....................... 525/367, 371, 372; 530/402, 409; 536/38

[56] References Cited
U.S. PATENT DOCUMENTS

| | | | |
|---|---|---|---|
| 2,420,735 | 5/1947 | Coffman et al. | 530/402 |
| 2,891,054 | 6/1959 | Sloan et al. | 536/38 |
| 2,970,132 | 1/1961 | Reynolds et al. | 525/372 |
| 3,082,193 | 3/1963 | Mendelsohn | 525/372 |
| 3,920,605 | 11/1975 | Sato et al. | 525/372 |
| 4,123,396 | 10/1978 | Rembaum | 525/372 |
| 4,242,506 | 12/1980 | Schweiger | 536/38 |
| 4,352,751 | 10/1982 | Wieder et al. | 530/409 |
| 4,375,431 | 3/1983 | Bradford et al. | 530/402 |
| 4,447,583 | 5/1984 | Hocker et al. | 525/372 |

Primary Examiner—Joseph L. Schofer
Assistant Examiner—Bernard Lipman
Attorney, Agent, or Firm—Marvin E. Jacobs

[57] ABSTRACT

Metal oxide containing polymers and particularly styrene, acrylic or protein polymers containing fine, magnetic iron oxide particles are formed by combining a $NO_2$-substituted polymer with an acid such as hydrochloric acid in the presence of metal, particularly iron particles. The iron is oxidized to fine, black $Fe_3O_4$ particles which deposit selectively on the polymer particles. Nitrated polymers are formed by reacting functionally substituted, nitrated organic compounds such as trinitrobenzene sulfonate or dinitrofluoro benzene with a functionally coreactive polymer such as an amine modified acrylic polymer or a protein. Other transition metals such as cobalt can also be incorporated into polymers using this method.

22 Claims, 2 Drawing Figures

MAGNETIC PARTICLES

ORIGIN OF THE INVENTION

The invention described herein was made in the performance of work under a NASA contract and is subject to the provisions of Public Law 96-517 (35 USC 202) in which the Contractor has elected not to retain title.

TECHNICAL FIELD

The present invention relates to the synthesis of magnetic polymeric particles and, more particularly, this invention relates to the preparation of small, uniform, magnetic and functional polymeric microspheres.

DESCRIPTION OF THE PRIOR ART

Magnetic particles find uses in many fields such as paints, inks, magnetic recording media in tape or disc form and oil spill clean up. Magnetic particles also find use in biology as substrates or carriers for enzymes or proteins and in cell biology as substrates derivatized with ligands capable of labelling specific cells. The labelled cells can then be separated from mixtures with unlabelled cells or from mixtures with other proteinaceous material. Magnetic microspheres can also be utilized to deliver a pharmaceutical to a specified location or organ in an animal.

Magnetic oxides and electron dense metals such as iron can also be useful in cell identification by electron microscopy. Rembaum, et al. (*Science*, 208: 364, 68, [1980]) disclose identification of malignant cells in mixture with normal cells by this technique. U.S. Pat. No. 4,169,804 discloses use of magnetic-ligand particles for measurement of hormones and vitamins. Antibody-labelled magnetic microspheres have also been utilized to specifically bind to malignant cells in the treatment of leukemia (Poynton, et al., *The Lancet*, 5 Mar. 1983, p. 524). Molday, et al., (Nature, 268:437–438 [1974]), U.S. Pat. Nos. 4,157,323, 4,177,253 and 4,267,235 also disclose use of magnetic microspheres in the labelling and separation of specific animal cells.

Magnetic polymers have also been formed by dispersing the magnetic powders in preformed polymers. This technique is limited to soluble or meltable polymers and requires separate post-polymerization apparatus and processing and adds an additional energy cost to the product. Magnetic polymeric materials are generally produced by suspending magnetic particles in the liquid phase of the polymerizable formation and polymerizing the monomers in presence of the particles to form polymeric particles. Polymerization can be by addition or condensation and can be conducted in bulk, emulsion or solution. Many of the magnetic particles are not incorporated into the resulting polymer and the size of the polymer particles must necessarily be larger than the magnetic particles. It is difficult to maintain a uniform suspension of the magnetic particles. The polymer particles do not contain a uniform amount of magnetic particles. The excess magnetic particles must be recovered from the polymerization formulation in post-polymerization processing steps.

U.S. Pat. No. 4,339,337 discloses the preparation of magnetic beads by dispersing a magnetic filler in a solution of polymer dissolved in a polymerizable vinyl aromatic compound and polymerizing the compound. In U.S. Pat. No. 4,358,388 the magnetic filler is dispersed in an organic phase containing dissolved initiator and vinyl aromatic monomer. The organic phase is emulsified and polymerized to form a latex.

Magnetic polyglutaraldehyde microspheres are prepared by polymerization of glutaraldehyde in presence of magnetic particles (U.S. Pat. Nos. 4,267,234 and 4,267,235) and magnetic polyacrolein microspheres are also prepared by in-situ polymerization of acrolein in presence of magnetic particles (U.S. Pat. No. 4,438,239).

U.S. Pat. No. 4,234,496 discloses the formation of magnetic polyvinyl pyridine beads complexing the amine group with metal salts and reducing the complex to form finely divided free metal or metal oxides. This technique is limited to complexing with certain acids and the glass transition temperature of polyvinyl pyridine is low.

Porous particles containing magnetic iron oxide are available from SINTEF Foundation, Norway.

STATEMENT OF THE INVENTION

Magnetic polymer particles having high magnetic strength are consistently produced by the method of the present invention. The particles contain uniform amounts of fine, black magnetic oxide throughout the polymer particles. The magnetic oxide is believed to be mostly magetite, $Fe_3O_4$. The magnetic particles are provided by a novel method.

The method of the invention utilizes a $NO_2$ containing polymer substrate. Magnetic oxide is introduced into the polymer substrate by reacting the metal and polymer in the presence of acid. Hydrogen bubbles are observed during the reaction. Very fine, black, magnetic oxide is deposited on the surface of the polymer. It is believed that the metal oxide deposits are located at the site of the residue of the nitro group.

The polymer substrate can be porous or non-porous. The fine magnetic particles may deposit and form within the porous polymeric substrate. The polymer substrate can be in the form of particles, film, sheets or rods and can be a large substrate or a very fine particle. Uniform particles of the order of 100 Angstroms to 10 microns are preferred as carriers for biological substances such as antigens or antibodies. Uniformly sized, small microspheres provide monodispersity and result in less nonspecific binding to the surface of cells or of the container.

The metal can be in the form of particles, wire, wool, turnings, etc. More vigorous reaction is observed when highly active forms, such as electrolytically reduced iron, are utilized.

The metal can be any metal oxidizable by organic nitro groups, preferably a transition metal such as iron, nickel manganese, or cobalt. In the case of iron powder, the method is believed to result in the production of mangnetite, $Fe_3O_4$, associated with the nitrogen containing group.

The prenitrated polymer can be commercial nitrocellulose, polynitrostyrene or nitrostyrene copolymers with other vinyl monomers such as styrene or methyl styrene. Polymers can be nitrated with a mixture of concentrated sulfuric acid and nitric acid. The polymer can be an alkylene polymer such as polyethylene, polypropylene or polybutene or a vinyl benzene polymer such as polystyrene or polymethyl styrene.

The nitrogen containing groups can be introduced into the polymer substrate by several techniques. Nitrogen containing monomers can be polymerized. Preformed polymers can be nitrated or reacted with or adducted to reactive nitrogen containing compounds.

Another method for introducing nitro groups into polymers is to react a polymer substituted with a functional group, such as an amine with a nitrated compound substituted with a group, Z, such as a sulphonic chloride or halogen, such as chlorin, which reacts with and couples the compound to the polymer. For example:

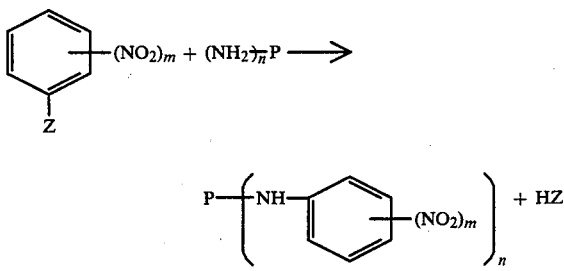

where P represents polymer backbone, m is an integer from 1 to 3, n is an integer and Z is a functional group. Suitable functional reactive compounds are trinitrobenzene sulfonate or dinitrofluorobenzene, both of which react with amine groups of protein to couple the nitrated aryl nucleus to the protein polymer. A representative protein is albumin.

The nitro-containing polymer particles may also be treated to add a visual label such as a fluorescent dye. An amine reactive dye such as fluorescein isothiocyanate could be coupled to the amino sites on the surface of the particle. However, it is preferred to preserve the amine site for use in attaching ligands. Fluorescent dyes are added preferably by radiation grafting of a monomer onto the surface of the particle in the presence of a dye reactive monomer, such as an allyl amine. The dye is then reacted with the allyl amine group.

The magnetic particles of the invention will find use in magnetic memory, paints, inks, catalysis, etc. Nitrocellulose particles are porous and inexpensive and will find use in the manufacture of magnetic recording film or as an absorbent for the clean up of oil spills.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
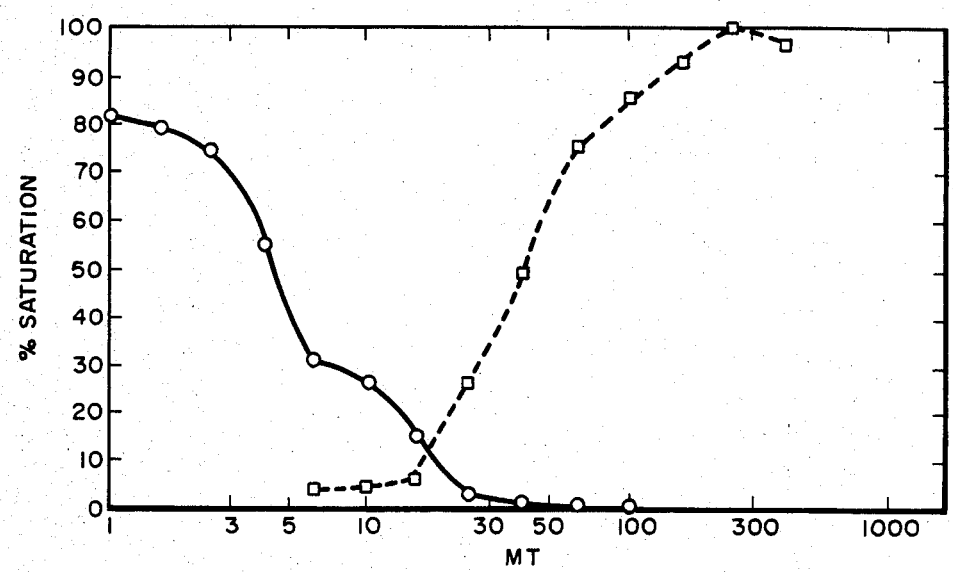
FIG. 1 is a set of curves showing percent magnetic saturation versus m Telsa (MT) of black microspheres of the invention.
Figure 2:
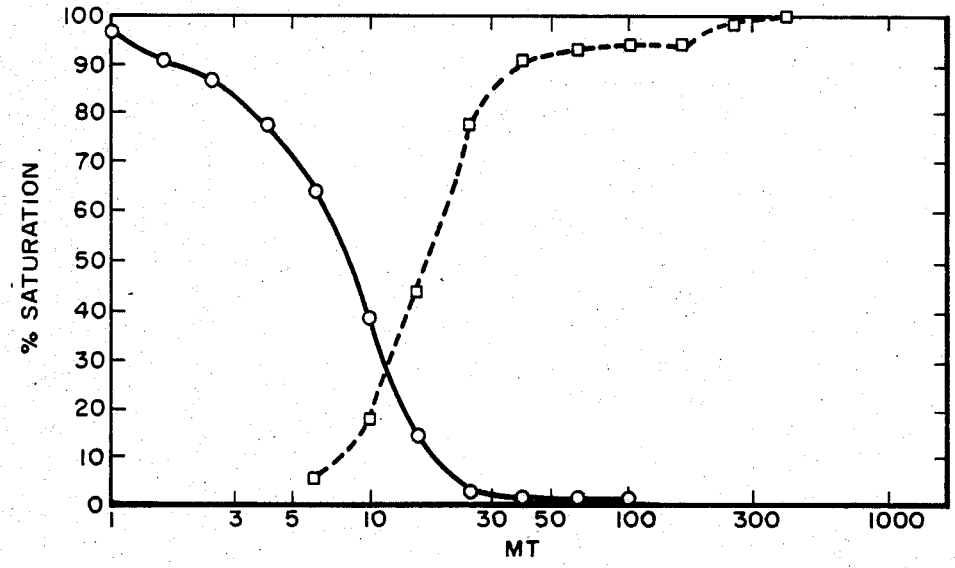
FIG. 2 is a set of curves showing percent magnetic saturation versus m Telsa (MT) of red microspheres produced by SINTEF Foundation.

Metal oxide containing polymeric materials are prepared according to the following reaction:

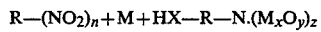

where R is a polymeric substrate, n is an integer M is a metal oxidizable by R—NO$_2$, X is an inorganic anion, and x, y and z are integers.

The degree of nitration can be varied widely depending on the amount of metal oxide required on the polymer. The polymer can be nitrated to an extent of at least one nitro group per every monomer group down to a level of 5 percent nitration of the monomer groups, usually from 10 to 40 percent of the monomer groups contain a nitro group.

The amount of functional ligands capable of derivatization on the particles is related to the surface area of the particle. Surface area is greatly increased in the case of highly porous particles. Uniformity of particle size is also important since non-uniform particles tend to clump together or non-specifically bind to other surfaces. Monodispersity, provided by uniform particle size, avoids this problem. These spheres can be prepared by successive seeded emulsion polymerization in presence of non-reactive diluent.

The polymer can also contain an excess of amine or other functional groups capable of binding to biological materials such as hydroxyl, aldehyde, carboxyl and the like. Amine functionality can be provided by post polymerization reaction of polymer substances with amine functional compounds which couple to the functional groups on the polymer. Suitable coupling reagents are diamines or diimidazoles.

Functional polymers are readily formed from monomer mixtures containing 25 to 95 percent of mono-unsaturated bonding monomers that are freely water soluble. These monomers are suitably selected from amino, carboxyl, aldehyde or hydroxyl containing monomers. Exemplary monomers are acrylamide (AM), methacrylamide (MAM), acrylic acid (AA), methacrylic acid (MA), acrolein, dimethylamino-methacrylate of hydroxyl-lower alkyl or amino-lower-alkyl-acrylates such as those of the formula:

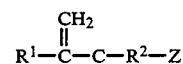

where R$^1$ is hydrogen or lower alkyl of 1-8 carbon atoms, R$^2$ is alkylene of 1-12 carbon atoms, and Z is—OH or R$^3$—N—R$^4$ where R$^3$ or R$^4$ are individually selected from H, lower alkyl, or lower alkoxy of 1-8 carbon atoms. 2-hydroxyethyl methacrylate (HEMA), 3-hydroxypropyl methacrylate and 2-aminoethyl methacrylate are readily available commercially. The porosity and hydrophilicity increase with increasing concentration of these monomers.

Inclusion of polyunsaturated compounds also provides cross-linked beads which are less likely to agglomerate. The polyunsaturated compounds are generally present in the monomer mixture in an amount from 0.1–20 percent by weight, generally 6–12 percent by weight and are suitably a compatible diene or triene polyvinyl compound capable of addition polymerization such as ethylene glycol dimethacrylate, trimethylol-propane-trimethacrylate, N,N'-methylene-bis-acrylamide (BAM), hexahydro-1,3,5-triacryloyl-s-triazine or divinyl benzene.

In order to form particles having a very small size, the monome mixture preferably contains a large percentage, suitably from 40-70 percent, of sparingly water soluble monomers having hydrophobic characteristics since this is found to result in freely suspended individual small beads. In the absence of such monomers, the particles are relatively large in diameter. Initiator and surfactant concentrations also have a pronounced effect on the particle size. Hydrophobic characteristics can also be provided with monomers such as alkyl acrylates, suitable methyl methacrylate or ethyl methacrylate or a vinyl pyridine. Suitable vinyl pyridines are 2-vinyl pyridine, 4-vinyl pyridine and 2-methyl-5-vinyl pyridine.

Fluorescence can be provided by copolymerization with addition polymerizable fluorescent comonomers such as dansyl allyl amine or functional substituted monomers such as aminofluorescein, 9-amino acridine, fluorescein isothio-cyanate and the like. Another technique which introduces fluorescent groups into the polymer is to radiation graft acrolein to the polymer in the presence of allyl amine. An amine reactive fluorescent compound such as fluorescein isiothiocyanate can then be reacted with the polymer.

EXAMPLE 1—Nitration of Polystyrene

To 25 ml of polystyrene suspension (20 percent solids) was added 15 ml of a 4/3 ratio of conc. $H_2SO_4$ and conc. $HNO_3$ dropwise with stirring at room temperature over a one-half hour period. The mixture was then heated to 50° C., then 15 ml more of the acid mixture was added dropwise and allowed to stir with heating for five hours. The suspension was then washed repeatedly and dried under vacuum. The polymer showed strong $NO_2$ absorptions in the IR.

EXAMPLE 2—Magnetic Polystyrene Particles

To 2 g of the nitrated polystyrene from Example 1 was added 8 ml of distilled $H_2O$ and 3 g of finely divided elemental Fe powder. 2 ml of concentrated HCl was added dropwise and the mixture was agitated by means of a motorized glass stirrer. The mixture was heated to reflux for four hours then washed repeatedly with distilled $H_2O$. Magnetic particles were separated by a CsCl (8 M) density column. Middle band after centrifugation consisted of magnetic polystyrene particles.

EXAMPLE 3—Preparation of Monodisperse Polystyrene Microspheres

Polystyrene microspheres of very narrow size distribution are prepared by the "successive seeded emulsion polymerization" technique. The method includes the use of a seed latex of smaller size (available from Dow Diagnostics) and growing the particles to a larger size in the presence of a monomer, an initiator and an emulsifier.

A 250 ml three neck bottle was charged with the following materials:
monodisperse polystyrene seed: 50 ml
distilled water: 100 ml
cyclohexane: 15 ml
styrene: 20 ml
divinyl benzene: 4 ml
benzoyl peroxide: 0.050 g
sodium dodecylsulfonate: 0.150 g The mixture was stirred at room temperature for 8 hours to allow monomer and crosslinking reagent to swell the seed latex particles. A stream of nitrogen gas was then bubbled into the mixture for five minutes and temperature of reaction mixture was raised to 75° C. After 15 hours of reaction, it resulted in a latex suspension of polystyrene particles of 1.2 μm in diameter with very narrow size distribution.

EXAMPLE 4—Magnetic Monodispersed Polystyrene

Monodispersed polystyrene from Example 3 was first nitrated according to the procedure of Example 1. About 1 ml of nitrated polystyrene suspension (10 percent solids) was placed in a bottle and 0.2 g of Fe powder was added. To the above, 2 ml of conc. HCl was added and the contents heated at 90° C. for five hours. The product was washed and separated by a CsCl density column.

EXAMPLE 5—Crosslinked Polymethylstyrene

Crosslinked particles (4 g) of methylstyrene having a diameter of 3.1 m were placed in a beaker within an ice bath and 10 ml of a 19 to 1 ratio of conc. $H_2SO_4$ and $HNO_3$ was added. It was allowed to react 2-3 hours and then at room temperature overnight (15 h). The resulting suspension was then washed repeatedly and dried under vacuum. The brown residue showed strong $No_2$ absorption in the IR.

EXAMPLE 6

To 1 g of the nitrated polymer of Example 5 was added 20 ml of $H_2O$ and sonicated. 0.5 g Fe was then added and the mixture heated with stirring to 80° C. Then 0.2 ml of conc. HCl was added and the mixture stirred for 1½ hours with side of vessel washed down with the mother liquor about every 15 minutes. It was then washed repeatedly with distilled $H_2O$. The reaction mixture placed in a saturated CsCl gradient moving about 90 percent of the polymer to the surface of the solution. A magnetic polymethyl styrene was recovered.

EXAMPLE 7—Magnetic Cellulose 0.5 g of guncotton (pyrotechnical grade of nitrocellulose) was incubated with 10 g iron powder in 35 ml of $H_2O$ containing 0.25 ml of 11.5 N HCl. The mixture was stirred by shaking. Purification by centrifugation over CsCl (saturated) yielded a pellet of unreacted iron powder and a layer floating on the CsCl which was washed in water to yield a magnetic cellulose powder.

EXAMPLE 8—Magnetic Nitrocellulose Beads 2 grams of nitrocellulose was added to 11 ml of a solvent consisting of 10 parts ether and 1 part methanol (by volume). This mixture was then vortexed, shaken and bath sonicated until most of the nitrocellulose (99 percent) had dissolved.

While 2 ml of this solution was vortexed, an aqueous solution was added 50 microliters at a time. The solution was made up of 10 ml non-ionic surfacant (0.6 percent) and of 2 ml SDS (10 percent).

The resulting emulsion was then stirred overnight at about 30° C. to evaporate the ether. The resulting nitrocellulose beads (of about 10 micron average diameter) were then washed one time with distilled water and then resuspended in 10 ml of 1 percent SDS.

4 ml of this bead suspension was placed in a 15 ml tube. 100 microliters of a 10 percent solution of ferric chloride (resultant pH 2.5-3.5) was added and then 3 grams of elemental iron was added to the tube. The mixture was heated 68°-72° C. for 80 minutes, then stirred overnight at about 30° C. The beads were separated from the iron particles by centrifugation over a saturated cesium chloride solution. The resulting beads were very magnetic.

Ferrofluids are commercial materials in which magnetic iron oxides are stably suspended in organic or aqueous media. The invention provides a very direct and ready synthesis of magnetic fluids having similar characteristics.

EXAMPLE 9—Protein Ferrofluid 20 ml (200 mg) of bovine serum albumin (BSA) in 0.5 M sodium bicarbonate pH 9.5 was reacted with 10 ml of 2 percent aqueous trinitrobenzenesulfonate (TNBS; sodium salt) at 40° C. for 110 minutes, then at 4° C. for two days. The reaction mixture was then concentrated to 14 ml with dry Sephadex G-25, and dialized twice with 4 liters of 0.1 M sodium bicarbonate. Dialysis was then continued with distilled water until the dialysate was free of TNBS (no yellow color). Retentate volume: 22 ml.

2 ml of the retentate was combined with 2 ml of 10 percent sodium dodecylsulfate (SDS) and heated to near boiling in a water bath for 2-5 minutes. The reaction mixture was then acidified to about pH 5 with a few drops of 1 percent ferric chloride, care being taken not to precipitate the protein. 1.5 grams of elemental iron was then added and the mixture was heated to near boiling for 30 minutes, then stirred overnight at about 30° C. The elemental iron was then removed by centrifugation, and the supernatant tested for magnetic properties. The supernatant showed evidence of a "body force" when placed near a magnet of about 3 kilogauss, i.e., the fluid as a whole was attracted to the magnet indicating the product behaves like a ferrofluid.

Another example of preparation of a magnetic protein fluid follows:

EXAMPLE 10

Bovine serum albumin (20 ml-200 mg) reacted with trinitrobenzene sodium sulfonate (200 mg) at 40° C. for 24 hours. After dialysis against 0.1 M NaHCO$_O$ and water, 22 ml of trinitrobenzene derivatized albumin was obtained (TNB-albumin). To TNB albumin (2 ml) heated (near boiling) 2-5 minutes with SDS (2 ml 10 percent SDS) and acidified to pH 4 with FeCl$_3$, 1.5 g of elemental iron was added. After heating to near boiling, stirring overnight at room temperature and centrifuging, the supernatant acted like a ferrofluid.

EXAMPLE 11—Polyhema Beads

The following monomer mixture was prepared:
Hydroxethyl methacrylate: 4.0 ml
Acrolein: 3.0 ml
Methacrylic acid: 0.4 ml
Trimethylolpropane triacrylate: 0.4 ml The monomer mixture was suspended in 84 ml of distilled water containing 0.4 percent by weight of polyethylene oxide (MW-100,000). Nitrogen was bubbled through the mixture for about 2 minutes before irradiation with a cobalt 60 source for a total of five hours of radiation dosage rate of about 0.1 M rad/hour. The cloudy suspension was then repeatedly centrifuged and washed with 100 ml of distilled water to remove unreaacted monomers. Microspheres having a diameter of about 850 mm were recovered and suspended (0.6 percent) in Emulphogene.

EXAMPLE 12

A 10 ml microsphere suspension of Example 11 was reacted with 15 ml of a 10 percent aqueous solution of diaminohexane at room temperature for 3 hours. Excess diaminohexane was removed by washing four times with distilled water. The nitrogen content was found to be 45 percent indicating Schiff base formation was complete. The product was resuspended in 10 ml of 1 percent non-ionic surfactant.

EXAMPLE 13—TNBS Derivatization

A mixture of 2 ml of the suspension of diaminohexane derivatized beads formed in Example 12, 3 ml of 0.1 M sodium bicarbonate buffer (pH=9.7) and 0.5 ml of 5 percent TNBS solution was shaken overnight and then washed 3 times with distilled water. The reaction of TNBS with the amine groups was evidenced by the orange color of the microspheres. The microspheres were again resuspended in surfactant solution to form a 0.6 percent solution.

EXAMPLE 14

The TNBS activated microspheres of Example 13 were reacted with iron powder (99.9 percent pure) in the presence of aqueous HCl as follows: 0.2 ml of the nitrated microsphere suspension (5 percent solids) 0.5 g iron powder, 1 ml of 1 N HCl and 1 ml of 0.6 percent polyethylene oxide were mixed and heated to about 60° C. for 2 hours. The microspheres turned dark brown to black and were attracted to a magnet. The Fe$_3$O$_4$ content was about 20 percent.

EXAMPLE 15—Magnetic Polyhema Microspheres

About 100 mg of carbonyldiimidazole (CDI) activated 0.8 micron polymeric microspheres (80 percent hydroxyethylmethacrylate, 10 percent methacrylic acid, 10 percent bisacrylamide) was reacted with an extremely large excess of aqueous ethylenediamine-ethylenediamine dihydrochloride buffer pH 9.0 overnight at 4° C. (with constant rotational mixing).

The microspheres were centrifuge washed 3 times with distilled water and the final pellet resuspended in 2 ml water.

0.5 ml microspheres, 2 ml sodium bicarbonate buffer pH 9.0 V and 2 ml 2 percent trinitrobenzenesulfonate were reacted at 39.5° C. overnight (mixed occasionally for the first 90 minutes) then at 4° with constant rotational mixing for 3 days. The microspheres were then washed 3 times with 0.1 percent Tween-20.

In a small shell vial: a mixture of 1 ml water, 300 microliters of the above TNBS derivatized microspheres, 5 drops of 10 percent ferric chloride, and 0.55 gram of electrolytic iron was heated in a hot water bath (approximately 90° C.) for about 2 minutes. Then the incubation was continued for one hour in a hot water bath with constant sonication.

An aliquot of microspheres was then separated from the iron particles by centrifugation on a saturated cesium chloride solution. The microspheres were observed macroscopically and microscopically under the influence of a magnet. The microspheres were well dispersed and were magnetic.

The procedure of Example 2 was modified to determine whether the use of an iron chloride solution would provide the same reaction with nitrostyrene as iron metal in the presence of HCl.

EXAMPLE 16

To 15 ml of a nitrated polystyrene latex of diameter 1 micron (8 percent solids) was added 0.452 g of FeCl$_3$ and 0.332 g FeCl$_2$. The suspension was then stirred with a glass stirrer for 15 minutes (with no reaction). The temperature was then raised to about 100° C. (with no reaction). Then 5 ml of conc. HCl was added dropwise giving a deep orange colored solution. It was heated with stirring for an additional two hours. It was cooled and yielded no magnetic particles.

The magnetic properties of the black, magnetic polymethylstyrene microspheres prepared according to the procedure of Example 6 and red polystyrene microspheres obtained from SINTEF in Norway were characterized by SQUID magnetometry. First isothermal remanence (IRM) aquisition versus Percentage saturation remanence was determined for both microspheres and then alternating field (AF) demagnetization was determined and plotted, in each case, on the same figure.

The data indicates that the black microspheres of the invention contain mostly magnetite ($Fe_3O_4$) which saturated at 300 mT (mTesla) while the red microspheres contain iron oxide in predominantly maghema form ($\gamma Fe_2O_3$) since the percent saturation plateau occurred near 50 mT. The characteristics of both curves suggest that the magnetic carriers of both samples are single domain, fine grained particles.

EXAMPLE 17

To 0.2 grams of nitrated polystyrene microspheres (nitrated according to the procedure of Example 5) was added 5 ml of water, and while stirring 0.5 grams of finely divided elemental cobalt metal was added and the mixture heated to 80° C. Then 0.3 ml of conc. HCl was added and the mixture agitated at 80° C. for 1½ hours. The reaction mixture was then cooled and washed repeatedly. The resulting polystyrene microspheres were isolated by means of a saturated cesium chloride gradient, and found to contain 10.2% by weight cobalt by atomic absorption.

It is to be realized that only preferred embodiments of the invention have been described and that numerous substitutions, modifications, and alterations are permissible without departing from the spirit and scope of the invention as defined in the following claims.

We claim:

1. A method of producing magnetic polymeric particles comprising the steps of:
   combining a polymer containing organic nitro groups on the basis of from 5 percent nitration based on monomer groups up to four nitro groups per every monomer group with acid in the presence of a metal oxidizable by said nitro groups;
   oxidizing the metal to metal oxide; and
   depositing the metal oxide on the surface of the polymer to form a magnetic metal oxide containing complex at the site of said nitro groups.

2. A method according to claim 1 in which the metal is a transition metal.

3. A method according to claim 2 in which the metal forms a magnetic metal oxide complex.

4. A method according to claim 3 in which the metal is iron.

5. A method according to claim 4 in which the iron is in the form of particles.

6. A method according to claim 1 in which the acid is a hydrohalic acid.

7. A method according to claim 6 in which the acid is a hydrochloric acid.

8. A method according to claim 1 in which the polymer is selected from polymers of nitrated monomers or polymers nitrated after polymerization.

9. A method according to claim 8 in which the degree of nitration is from 10% to 40% of the monomer group.

10. A method according to claim 9 in which the polymers are selected from nitrocellulose or polymers or copolymers of nitrostyrene or nitromethylstyrene.

11. A method according to claim 8 in which a hydrocarbon polymer is nitrated by treatment with nitric acid.

12. A method according to claim 10 in which the polymer is a nitrated, monodispersed polystyrene.

13. A method according to claim 8 in which the nitrated polymer is the reaction product of a nitrated functional compound and a coreactive functionally substituted polymer.

14. A method according to claim 13 in which the nitrated functional compound of the formula:

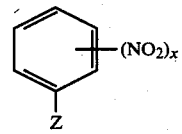

where x is an integer from 1 to 3 and z is a functional group, reacts with a polymer of the formula

where n is an integer to form a nitrated polymer of the formula

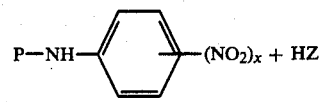

15. A method according to claim 14 in which Z is selected from $-SO_3$ and $-F$.

16. A method according to claim 15 in which the compound is selected from trinitrobenzene sulfonate or dinitrofluorobenzene.

17. A method according to claim 16 in which the amine substituted polymer is a protein.

18. A method according to claim 16 in which the amine substituted polymer is a diamine or diimidazole modified functional polymer.

19. A method according to claim 18 in which the polymer contains 25–95% of freely-water soluble unsaturated monomers substituted with amino, carboxyl, amide, aldehyde or hydroxyl and 0.1 to 20% of a diene or triene cross-linking reagent.

20. A method according to claim 19 in which the diamine is a diamino alkane containing 2 to 12 carbon atoms.

21. A method according to claim 1 where the acid is $FeCl_3$.

22. A method according to claim 2 in which the metal is cobalt.

* * * * *